Figure 1:
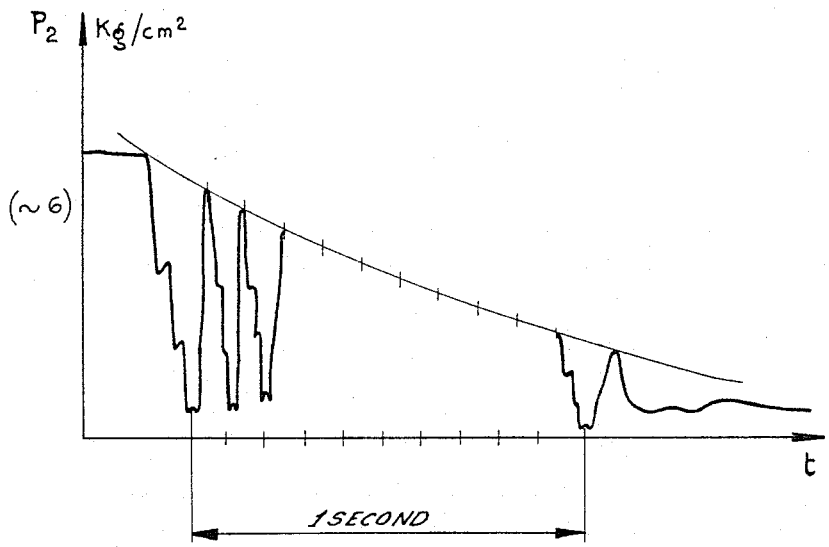

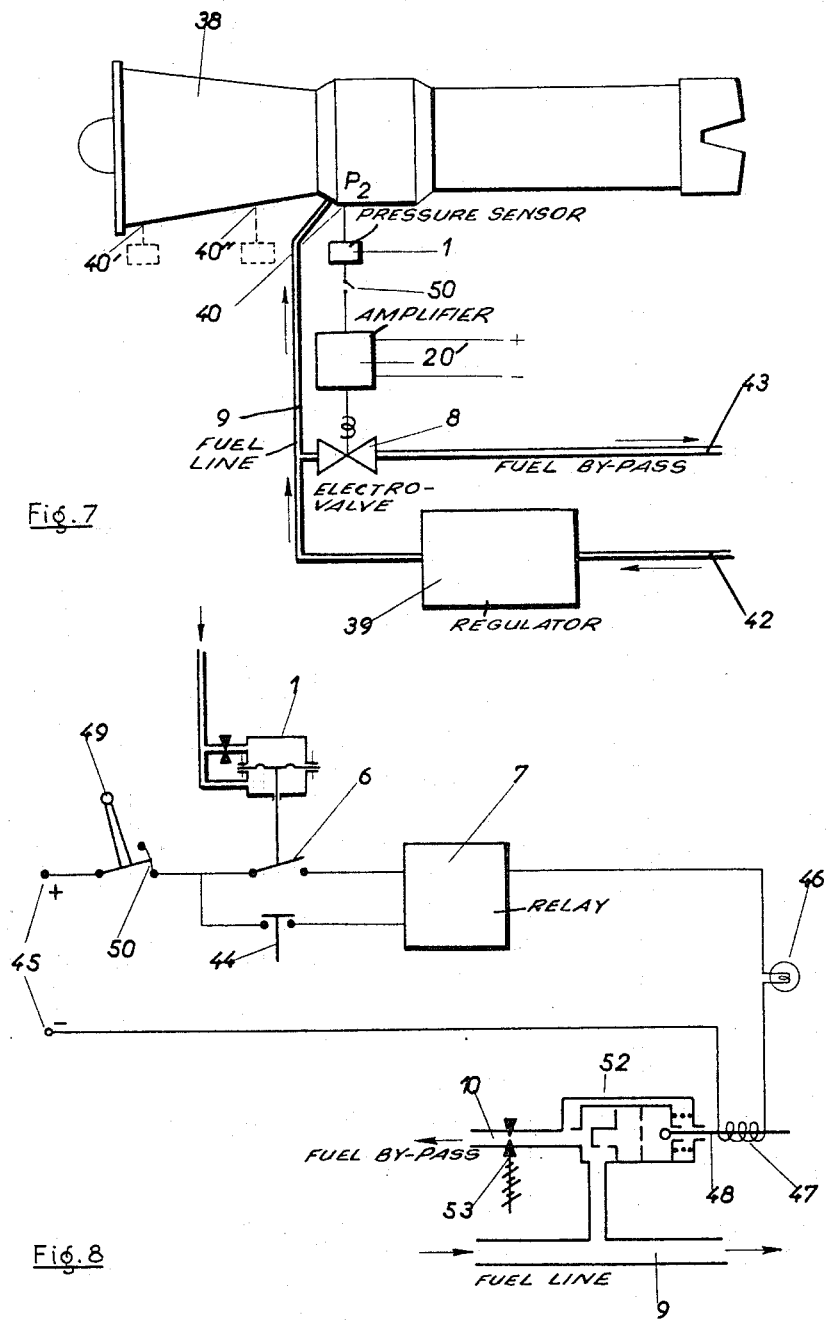

United States Patent Office 3,267,669
Patented August 23, 1966

3,267,669
ANTISURGE SYSTEM ADAPTED TO PREVENT THE STALLING OF TURBINE AEROENGINES
Roger Henri Tissier, Paris, France, assignor to Societe Nationale d'Etude et de Construction de Moteurs d'Aviation, Paris, France, a company of France
Filed Jan. 13, 1964, Ser. No. 337,365
Claims priority, application France, Jan. 16, 1963, 921,606
2 Claims. (Cl. 60—39.28)

Turbine aero engines used for aeronautical purposes operate generally at the limit of their possibilities with a view to ensuring maximum performances. In particular, one is led to make them operate very near the point at which the compressor begins surging, which surging would lead to a stalling of the machine, as a consequence of an untimely extinction in the combustion chamber.

As concerns an acceleration of the engine upon operation of the throttling lever, various arrangements have already been proposed so that the increased input of fuel producing acceleration of the engine may not lead to a stalling.

However there remain risks of stalling other than those produced by the movements of the throttling lever, for instance the risks ascribable to the modifications in the outline of the flying aircraft such as a poor input of air into the air entrances ascribable to the stationary operation of the so-called VTOL (vertical take-off and landing) aircrafts, or else a modification in the speed of the aircraft or a firing of guns or missiles and the like.

In contradistinction with what often happens during an acceleration in speed of the engine, the surging of the compressor in the above-referred to cases, progresses always in a gradual manner and the stalling of the machine occurs only after a more or less protracted number of surge pulses. It is found, as a matter of fact (as illustrated in the accompanying FIG. 1) that during the surging, the pressure P2 at the delivery end of the compressor, which is also that prevailing within the combustion chamber, is subjected to pulses (at the rate of about 10 per second) of which the peaks gradually decrease until extinction in the combustion chamber occurs, which corresponds to a stalling of the engine.

The present invention allows detecting the surging phenomena as soon as they appear and proceeding immediately with a counteraction corresponding to an unloading of the combustion chamber. The antisurge arrangement forming the object of the present invention includes chiefly means detecting the surges and actuating, through the agency of a transmission having a very short time lag, a control member producing an unloading of the combustion chamber, for instance by reducing the amount of fuel injected into said combustion chamber.

In order that such an arrangement may be efficient, it is obviously necessary that, after detection of the surges in the compressor, the unloading of the combustion chamber may be obtained in a sufficiently immediate manner so as to occur before the extinction in said chamber. Experiments made by the applicant have shown that the speed of operation of said arrangement is such that the surging of the compressor is limited in practice to a single pulse (as illustrated in FIG. 2 of the accompanying drawings), the pressure P2 reacting during the speedy rise produced by the first pulse, a substantially constant value which is however lower than the original value of said pressure.

The means detecting the surges may be positioned at the output end of the compressor or better still, at a stage of the compressor corresponding to the maximum sensitivity with reference to the surges.

Figure 2:
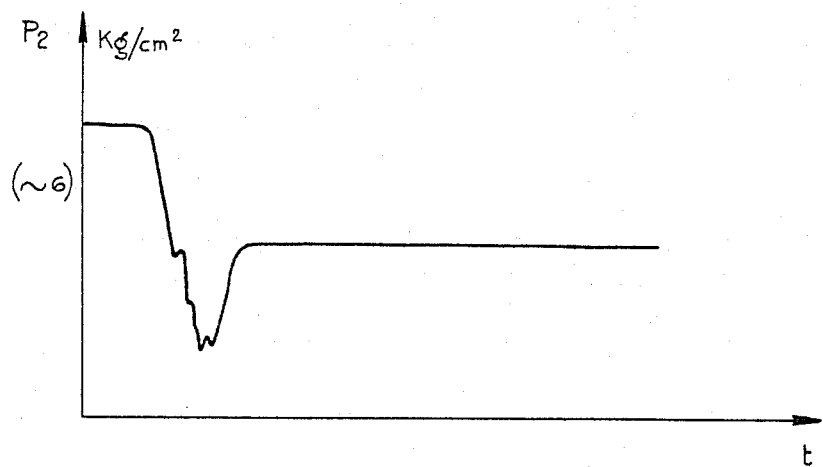
Figure 3:
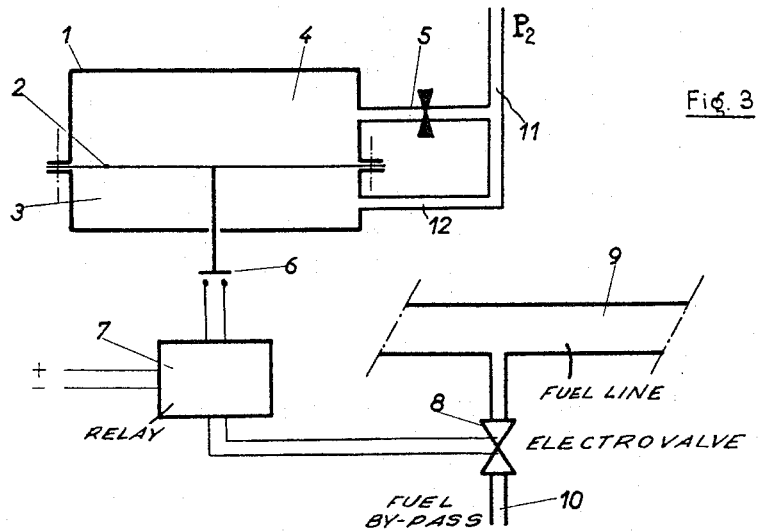
Figure 9:
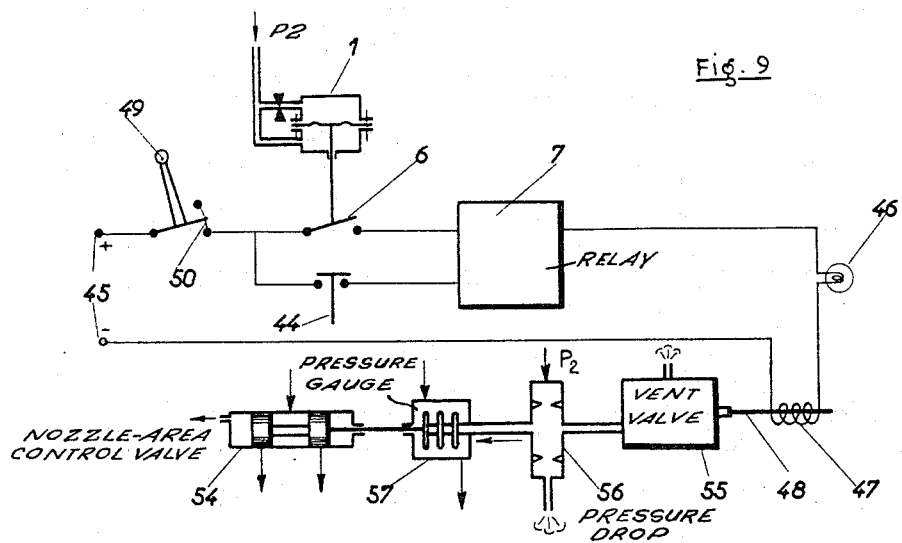
Figure 4:
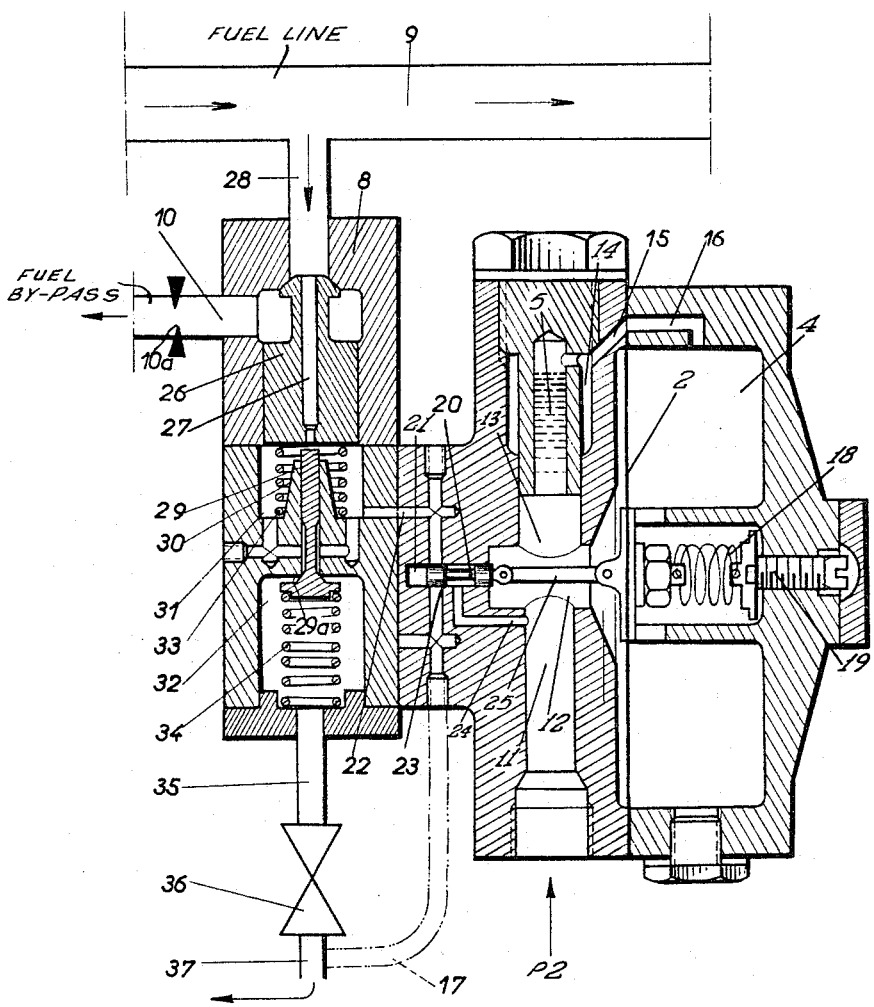
Figure 5:
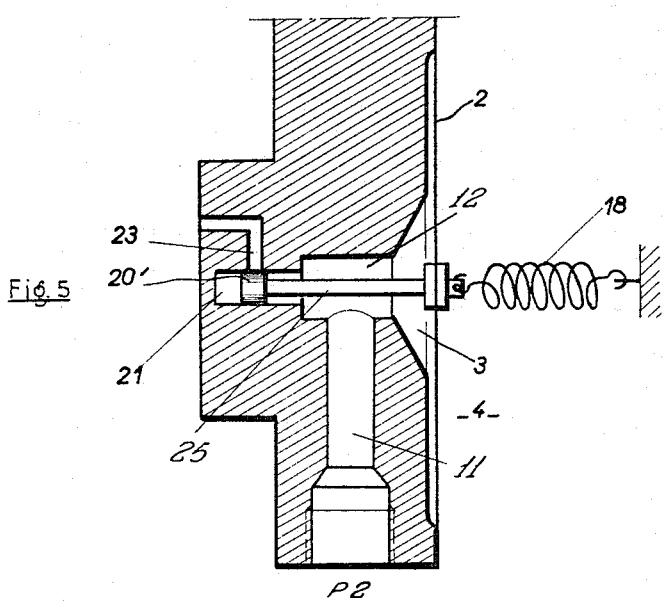
Figure 6:
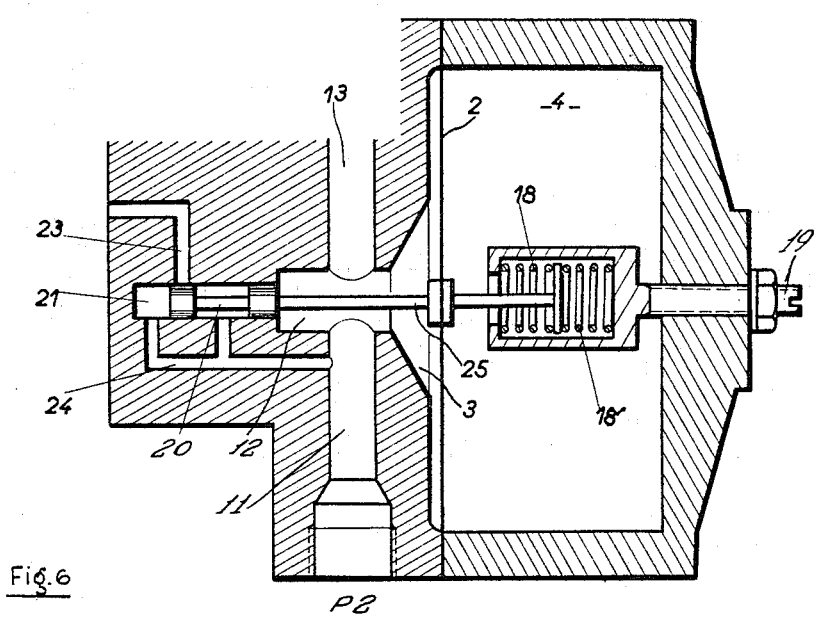
Figure 10:
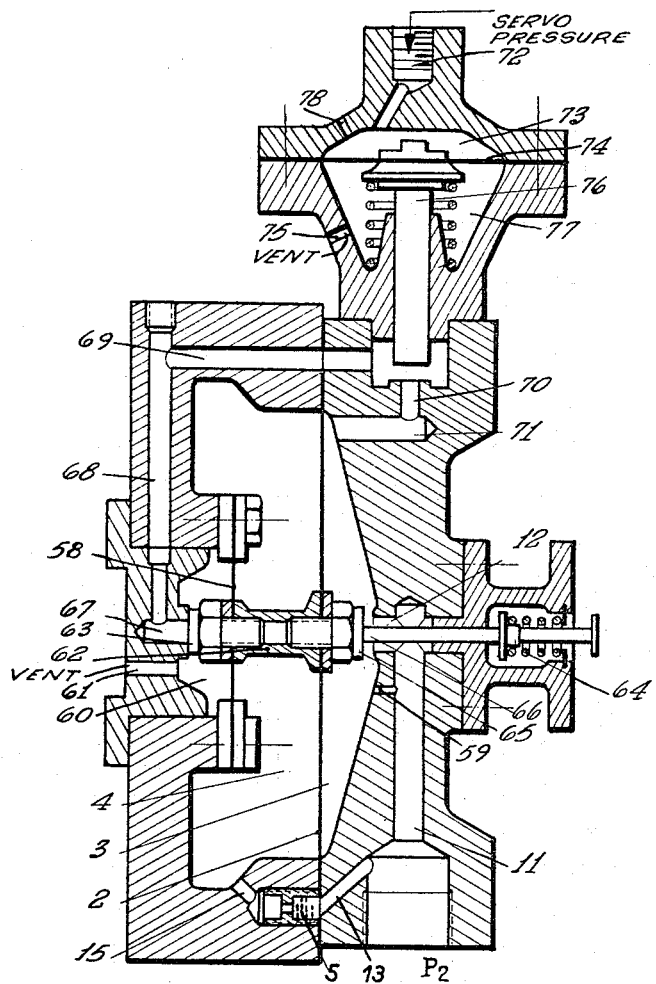

The following description, made with reference to the accompanying drawings given by way of example and by no means in a limiting sense, will allow an easy understanding of the invention. In said drawings:

FIGS. 1 and 2 already referred to are graphs showing the pressure P2 at the delivery end of the compressor as a function of the time $t$ during the surges, respectively in the case of a conventional turbine aero engine and in the case of a similar engine equipped with the antisurge arrangement according to the invention, FIG. 3 is a general diagrammatic view of the main components of such an arrangement, FIG. 4 is a cross-section of a hydraulic transmission system according to a first embodiment of the invention, FIGS. 5 and 6 are partial cross-sections showing detail modifications, FIG. 7 is a diagrammatic showing of an electric transmission system according to a further embodiment of the invention, FIGS. 8 and 9 show modified hit or miss arrangements, FIG. 10 is a cross-section of an improved embodiment of the invention.

The basic arrangement illustrated diagrammatically in FIG. 3 includes means detecting the surges and constituted chiefly by a container 1 subdivided by a diaphragm 2 into two compartments 3 and 4 which both communicate with the output of a compressor subjected to a pressure P2 or with an intermediate stage or even with the input of the compressor. The connection is established directly through the channels 11 and 12 for one of the compartments, say the compartment 3, and through the agency of a pipe 5 provided with a throttling diaphragm for the other compartment, say the compartment 4.

Under stabilized running conditions, the diaphragm 2 remains in equilibrium. Under the action of the pressure pulses in the compressor, that is during the surging, the movements of the diaphragm lead to a shifting of the latter which serves for actuation of an electric switch 6. The latter acts for instance through the agency of a relay 7 on an electrically-controlled valve 8, the opening of which provides a tapping of a fraction of the fuel flowing through the feed pipe 9 towards the injectors, into a shunt channel 10 returning the fuel into the fuel container on board the aircraft or into the suction end of the fuel pump. This leads to a reduction in the load acting in the combustion chamber and thus prevents any stalling.

The duration of the unloading period may be defined either by the pilot who restores the normal flow of fuel as soon as the cause producing the surging has disappeared, or else by delaying means which ensure a restoration of the normal flow of fuel after a predetermined time or else by any other suitable means. A lamp carried by the switchboard or the like indicating means may form a signal for the pilot, showing when the engine is subjected to conditions which may lead to a stalling.

Obviously, the detection of the surges may be performed through any other means and similarly the unloading of the combustion chamber may be performed otherwise than through a reduction in the feed of fuel, for instance by opening the reaction jet nozzle when the latter has a variable cross-section, by opening unloading valves provided on the compressor, or by adjusting the angular setting of the stator blades if the egnine is provided with an angularly adjustable blading.

Lastly the means detecting the surges may mechanically produce the unloading of the combustion chamber without it being necessary to resort to an electric transmission.

The proper operation of the arrangement is associated with the speed of unloading of the combustion chamber upon detection of the surging phenomena. The embodiment illustrated in FIG. 4 provides a practically instantaneous response to such a detection. Said embodiment acts directly on the fuel throughput, but it can also act, as already mentioned, on any other parameter reducing the load of the compressor or of the combustion chamber, say through action of the unloading valves in the compressor, the opening of the nozzle and the like.

In the fuel circuit 9 is inserted shuntwise a valve 26 the opening of which, controlled by the surge signal, allows shunting into the return channel 10 a predetermined proportion of fuel through a suitably sized throttling diaphragm 10a.

FIG. 4 shows again the surge detector which is subdivided into two compartments 3 and 4 by the diaphragm 2. The left hand compartment 3 is connected with the combustion chamber, which is not illustrated, through the channels 11 and 12 whereas the right-hand compartment 4 is connected with said combustion chamber through the channels 13, 5, 14, 15 and 16. The channel 5 includes a series of throttling diaphragms. The diaphragm 2 in the main detector chamber is subjected centrally to the action of a spring 18 adjusted by a screw 19, said diaphragm 2 abutting against the casing of the arrangement under stabilized running conditions.

The above described detector is associated with a hydraulic amplifier amplifying the pressure detecting signal, said amplifier being constituted by a double piston slide valve 20 sliding inside a cylinder 21 connected on the one hand, with the valve system 8 through the pipes 22 and 23 and, on the other hand, with a channel 24 leading to the channel 11 and to the combustion chamber. Said slide valve is coupled with the diaphragm 2 through a link 25.

As a modification, it may be of interest to connect the channel 23 directly with the low pressure section of the fuel circuit, for instance at the point 37 so as to cut out the channel 24 and to replace it by the channel 17 drawn in dotted lines.

The valve system 8 inserted shuntwise with reference to the main channel 9 feeding the fuel to the injectors includes:

The above referred to by-pass valve 26 the opening of which allows the fuel to enter the return channel 10 and which is provided with a central bore 27 the output end of which is throttled, An unloading valve 29 guided in a stationary section 30, Two chambers 31 and 32 carrying the springs 33 and 34 respectively, which springs urge onto their seats respectively the by-pass valve 26 and the unloading valve 29; there remains a narrow gap between the two valves 26 and 29 when in their closed positions, A resetting cock 36 connected with the chamber 32 through the channel 35 on the one hand and with the return channel 37 of the fuel circuit on the other hand.

The operation of the arrangement which has just been described is as follows:

During normal operation corresponding to the position illustrated in FIG. 4, the pressure of the fuel is exerted on both sides of the by-pass valve 26 facing the shunt channel 28 on the one hand and the chamber 31 on the other hand, as provided by the central bore 27 in the valve 26. The differential pressure exerted on the valve 26 and the action of the spring 33 hold the valve therefore on its seat and no amount of fuel is shunted off the channel leading it towards the injectors. The unloading valve 29 is also urged onto its seat 29a by the spring 34 in the chamber 32 communicating with the low pressure end of the circuit through the resetting cock 36 which is normally open.

The pressures prevailing in the two compartments 3 and 4 are equal to that prevailing in the combustion chamber. The position of equilibrium of the diaphragm 2 is such that the left-hand piston of the hydraulic amplifier slide valve 20 closes the channel 22 leading to the chamber 31. Just before a stalling, the pressure fed by the combustion chamber becomes pulsatory and the diaphragm 2 and consequently the pistons forming the slide valve 20 oscillate between the preceding position of equilibrium and a position lying to the left of the latter, for which the channels 22 and 23 leading to the cylinder 21, communicate with each other. The fuel contained inside the chamber 31 begins flowing out either through the channels 24 and 11 into the combustion chamber or else directly into the low pressure end for instance through the channel 17 towards the point 37, the pipe 24 being omitted in this latter case.

The throttling of the central bore 27 in the valve 26 prevents the immediate feed of fuel into the chamber 31 which empties, whereby the counter-pressure on the lower side of the valve 26 and the action of the spring 33 are no longer sufficient for balancing the pressure of fuel on the upstream side. Consequently the valve 26 moves off its seat and engages the valve 29 so as to close partly the leak through the central bore and to open last-mentioned valve whereby the fuel is speedily discharged out of the chamber 31 into the chamber 32 out of which it is returned to the point 37 since the cock 36 is open. The speedy release of the fuel out of the chambers 31 and 32 produces the opening to a maximum extent of the by-pass valve 26 so that the fuel is shunted partly into the return pipe 10.

Thus, the least pulse acting on the diaphragm 2 produces, by reason of the shifting of the slide-valve 20 associated therewith, the release of a sufficient amount of fuel for the by-pass valve 26 to open and to produce immediately the opening of the discharge or unloading valve 29 and the latter provides in its turn for a sudden and complete opening of said by-pass valve 26.

The unloading thus initiated continues until the pilot considers he can reset the arrangement after the compressor has resumed normal operation. The cock 36 is then closed during a certain time and the slide valve 20 being now in its closed position, the chambers 31 and 32 fill again with fuel through the partly closed bore 27. After closing of the valves 26 and 29, the cock 36 may be opened again and the pressure in the chamber 32 drops. The arrangement is now ready to operate again.

Obviously, it is possible to obtain the resetting automatically either after a predetermined lapse of time or when certain conditions are satisfied.

FIG. 5 shows a simplified modification of the hydraulic amplifier which includes in the present case, a single input 23 and a single piston on the slide valve 20'. The return of the fuel is performed through the channel 12 containing the carrier rod 25 of the slide valve or through a similar circuit towards the low pressure side of the fuel circuit, as disclosed precedingly.

FIG. 6 shows a further modification of such a hydraulic arrangement provided for the case where it is necessary to make use of the pulses lying both above and below the mean pressure in the combustion chamber. A double acting arrangement which is balanced under the antagonistic action of the two springs 18 and 18' controls the position of the slide valve 20 inside the cylinder 21 to either side of an inoperative position and produces an unloading of the combustion chamber, both in the case of a reduction in pressure as in that of an increase in pressure. A suitable adjustment allows giving the slide valve 20 a mean inoperative position either through shims or through a threaded rod 19 or through any other suitable means.

The invention covers also the use of transmissions executed otherwise than through hydraulic means since such transmissions may be executed electrically.

FIG. 7 illustrates diagrammatically such an embodiment provided for a reaction jet turbine 38 followed by its conventional regulating system 39.

The pressure tapped off at 40 at the delivery end of the compressor or at any suitable point 40' or 40" towards the upstream side of the compressor provides a modulation of an electric parameter in a detector 1 connected with an amplifier 20' through the agency of a switch 50. The output signal which is suitably amplified may then act on the electrically controlled closing valve 8 controlling directly the shunting of the fuel out of the input channel 9 feeding the combustion chamber.

During normal operation, the fuel is fed from the pump through the channel 42 into the regulator 39 and measured amounts of fuel enter the injectors through the input channel 9.

When the electrically controlled valve 8 opens after detection of a surge, a fraction of the fuel feeding normally the injectors is tapped off through the channel 43 with a very low loss of head towards the suction end of the pump or towards the fuel container.

FIGS. 8 and 9 are wiring diagrams associated with hit or miss arrangements. The diaphragm detector closes intermittently the switch 6 as soon as the signal corresponding to the detected pressure becomes pulsatory which shows that a surge has arisen. The relay 7 continues being fed thenafter through the closing of a self-energized relay 44 by the current tapped off the terminals 45. In the relay circuit, a witness lamp 46 is thus ignited while a solenoid 47 shifts a metal rod 48 adapted to transmit the output signal through an axial translational movement. The pilot releases afterwards through a handle 49 the general switch 50 when he considers the dangerous period is at an end and he sets then the arrangement into its original operative condition by reengaging said switch.

In FIG. 8, the output signal acts on the unloading of the combustion chamber. The fuel passing through the channel 9 feeding the combustion chamber is tapped off into the return channel 10 by a valve 52. The speed of unloading may be adjusted, if required, by a throttled diaphragm 53.

In FIG. 9, the output signal controls the area of a conventional jet propulsion nozzle equipped with ordinary nozzle-area varying members actuated by hydraulic jacks under the control of a slide-valve 54. The latter is operated in a conventional way by making it respond to a pressure gauge 57 sensitive to the output of pressure reducing means 56 fed with pressure P2 and controllably vented to the atmosphere by means of a valve 55 which forms, together with the coil 47, an electrovalve.

However, it is obvious that the pressure P2 prevailing in the combustion chamber is reduced at high altitudes so that a diaphragm which is suitable for operating at ground level or at a low altitude lacks sensitivity at high altitudes. Generally speaking, the variation in pressure at the beginning of the surging is sufficient for operating the arrangement, but, if not, it is possible to resort to the arrangement illustrated in FIG. 10 which allows using the same diaphragm at all altitudes by subjecting it to a differential pressure the value of which decreases with increasing altitudes. The chamber of said detector contains two diaphragms 2 and 58 separating it into three compartments:

The compartment 3 communicating with the combustion chamber through the channels 11, 12 on the one hand and through the channel 11 and the port 59 of a reduced cross-sectional area, on the other hand.

The compartment 4 communicating also with the combustion chamber, but through the channels 13, 5 and 15, of which the channel 5 is throttled by a diaphragm.

A compartment 60 subjected to the outer circumambient pressure through a channel 61.

A stay 62 rigidly interconnects the two diaphragms 2 and 58 through their central portions and carries at its left-hand end a valve head 63 closing normally a channel 67 and at its right-hand end a valve head 65 controlling the connection between the chamber 3 and the combustion chamber through the channel 12. A pusher member 66 normally urged into contact with the stay 62 by a spring 64 serves as a signal detector.

The valve 63 controls the setting of the chamber 3 under the pressure of the circumambient atmosphere through the channel 61, the chamber 60, the above mentioned channel 67 and the further chanels 68, 69, 70, 71. This connection between the chamber 3 and the outer atmosphere through the chamber 60 is controlled by a valve 76 subjected to the shifting of a diaphragm 74 separating two chamber 73, 77 which are permanently connected with the atmoshpere, respectively through the throttled port 78 and through a simple port 75. The chamber 73 communicates furthermore for instance with the combustion chamber through a channel 72 and is provided with a resetting cock which is not illustrated.

It is however possible to resort to any other controlling pressure fed into said channel 72.

Under stabilized running conditions, as illustrated in FIG. 3, the valve 63 engages its seat and the valve 65 opens under the action of the difference between the pressures exerted on the diaphrgams 2 and 58 and in an auxiliary manner by the spring 64. The two chambers 3 and 4 are both subjected to the pressure P2 in the combustion chamber, whereas the chamber 60 is subjected to atmospheric pressure.

The sudden drop in pressure in the combustion chamber, just before a stalling, is transmitted immediately to the chamber 3, but only very slowly to the chamber 4 by reason of the throttling in the channel 5. As a consequence of the difference between the pressures to either side of the diaphragm 2, the latter moves towards the right-hand side. The valve 63 opens and the valve 65 closes.

The pusher member 66 can then release an electric signal through a miniature switch or a mechanical signal through a hydraulic or pneumatic leak or through a remote transmission, in order to reduce the input of fuel or to open the nozzle of the engine.

The chamber 3 is now subjected to the pressure of the circumambient atmosphere while the chamber 4 communicates with the pressure P2 in the combustion chamber. The latter pressure being always higher than the first mentioned pressure, the arrangement remains in an open stable condition. The resetting which is controlled either by the pilot or through automatic means is obtained through the opening of the electrically controlled valve inserted in the channel 72 fed by any suitable control pressure as disclosed. The pressure enters the chamber 73 and acts on the upper surface of the diaphrgam 74. The latter being subjected on its opposite side, to the weaker atmospheric pressure transmitted through the port 75 urges the valve 76 onto its seat so as to close it.

The chamber 3 being no longer subjected to external pressure, the permanent connection 59 with the combustion chamber allows the pressure in the latter to resume its value P2.

The pressures to either side of the diaphragm 2 are then equal inside the corresponding chambers 3 and 4 and, since atmospheric pressure prevails inside the chamber 60, the movable diaphragm system moves leftwards, which has for its result to close the valve 63, to open the valve 65 and to release the shank of the valve 63 which serves for the obtention of the electric or mechanical signal adapted to unload the engine.

The resetting valve in the channel 72 is then closed and atmospheric pressure is slowly restored inside the chamber 73 through the throttled port 78. The diaphragm 74 which is subjected to atmospheric pressure on both sides opens the valve 76 which produces no change in pressure since the cooperating valve 63 is already closed. The different parts of the arrangement return into the positions corresponding to normal running conditions of the engine, which latter is now ready to operate again when required.

It is found that the arrangement described is released by a drop in pressure $\Delta P2$ such that $$(P2-\Delta P2)S2 < P2(S2-S58) \text{ or } \Delta P2 > P2 \cdot S58/S2$$

$S2$ and $S58$ being the operative surfaces of the corresponding diaphragms 2 and 58 subjected to pressure while $P2$ designates the relative pressure in the combustion chamber.

It is sufficient to make the ratio $S58/S2$ match the desired sensitivity.

Applicant has found experimentally that it is actually possible to detect an initiating surge in sufficient time and to bring a speedy remedy thereto so as to stop the first surging pulse before it reaches its normal end.

What I claim is:

1. In combination with a turbine aeroengine including a compressor subject to surges, the provision of an anti-surge arrangement comprising signalling means detecting the surges and including a chamber, two diaphragms subdividing said chamber into three separate compartments of which one outer compartment is permanently connected with the atmosphere, an unobstructed connection between one of the other compartments and the compressor, a throttled connection between the last compartment and the compressor, means through which the two first-mentioned compartments communicate, a member rigidly interconnecting the two diaphragms, a valve controlled by said interconnecting member and controlling last-mentioned means, a member adapted to unload the engine to prevent a stalling of the engine under the action of surges, and means operatively interconnecting the diaphragm system with the engine-unloading member and adapted to transmit to the latter with a very short time lag the shifting of the diaphragm system produced by the surges acting differentially in the two last-mentioned compartments, the valve controlling the means through which the two first-mentioned compartments communicate opening said communicating means upon shifting of the diaphragm-interconnecting member.

2. In combination with a turbine aeroengine including a compressor subject to surges and a combustion chamber, the provision of an anti-surge arrangement comprising signalling means detecting the surges and including a chamber, two diaphragms subdividing said chamber into three separate compartments of which one outer compartment is permanently connected with the atmosphere, an unobstructed connection between one of the other compartments and the combustion chamber, a throttled connection between the last compartment and the combustion chamber, means through which the two first-mentioned compartments communicate, a member rigidly interconnecting the two diaphragms, a valve controlled by said interconnecting member and controlling last-mentioned means, a member adapted to unload the engine to prevent a stalling of the engine under the action of surges, and means operatively interconnecting the diaphragm system with the engine-unloading member and adapted to transmit to the latter with a very short time lag the shifting of the diaphragm system produced by the surges acting differentially in the two last-mentioned compartments, the valve controlling the means through which the two first-mentioned compartments communicate opening said communicating means upon shifting of the diaphragm-interconnecting member.

References Cited by the Examiner

UNITED STATES PATENTS

| | | | |
|---|---|---|---|
| 2,926,524 | 3/1960 | Sanders | 73—116 |
| 3,018,621 | 1/1962 | Arnett et al. | 60—39.28 |
| 3,053,047 | 9/1962 | Bodemuller | 60—39.28 |
| 3,167,082 | 1/1965 | Oliphant | 60—39.28 X |

JULIUS E. WEST, *Primary Examiner.*